Feb. 6, 1934. C. O. GUERNSEY Re. 19,071
CLUTCH OPERATING MECHANISM
Original Filed March 5, 1925
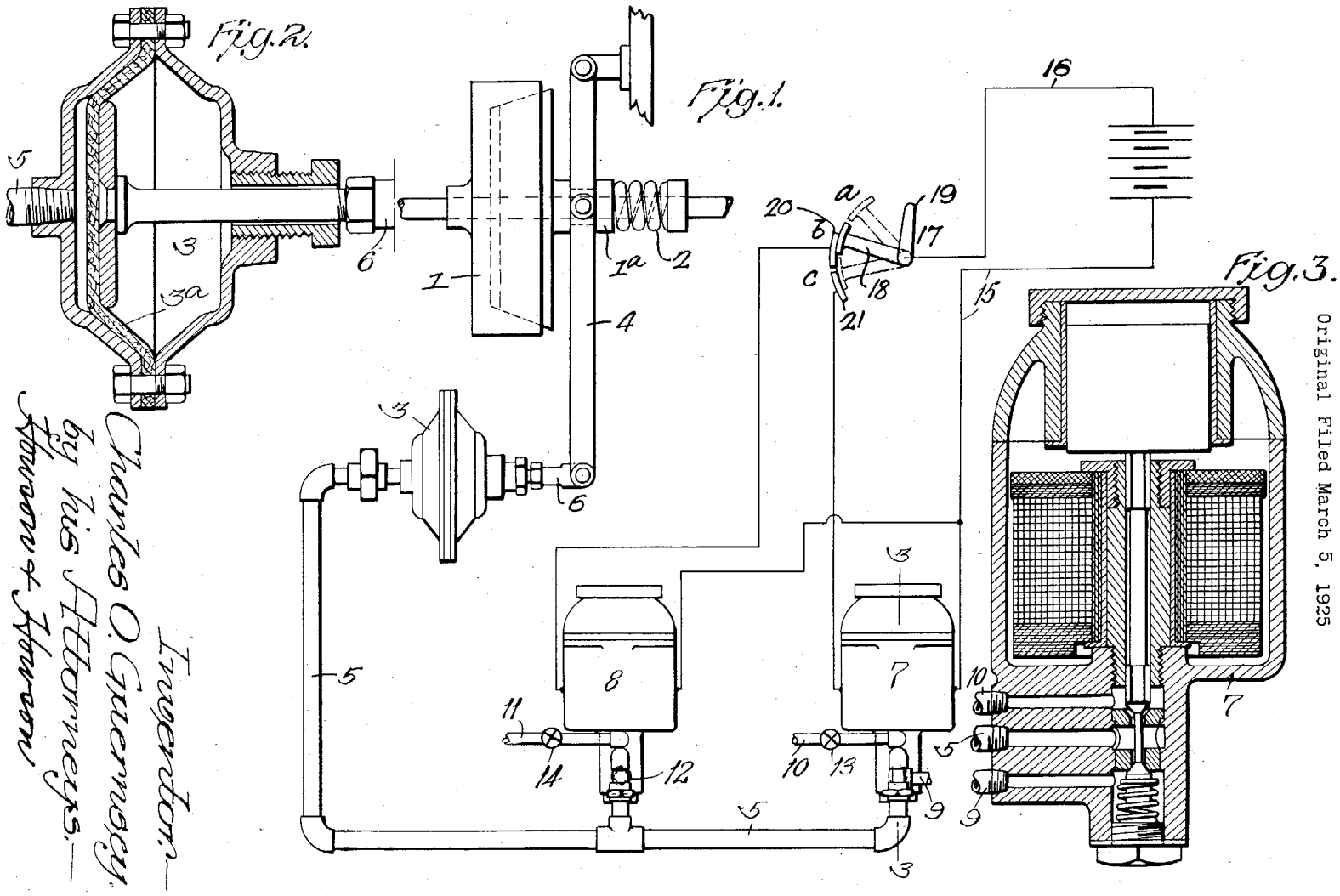
Inventor—
Charles O. Guernsey.
by his Attorneys.—
Howson & Howson Reissued Feb. 6, 1934

Re. 19,071

UNITED STATES PATENT OFFICE 19,071

CLUTCH OPERATING MECHANISM

Charles O. Guernsey, Philadelphia, Pa.

Original No. 1,608,277, dated November 23, 1926, Serial No. 13,411, March 5, 1925. Application for reissue March 25, 1932. Serial No. 601,240

20 Claims. (Cl. 192—91)

This invention relates particularly to clutch operating mechanisms adapted for use on railway cars or coaches which are driven by means of internal combustion engines. It will be understood, however, that while the invention is particularly intended for this class of service, it is by no means so limited.

The principal object of the invention is to provide an operating mechanism for the clutch which will require a minimum of effort on the part of the operator, which will serve to engage the clutch gradually and without shock, and which is simple in construction and reliable in operation. Other objects of the invention will be apparent from the following specification and claims.

In the accompanying drawing I have shown the embodiment of the invention which I now deem preferable, but it will be understood that various changes and substitutions may be made within the scope of the claims without departing from the spirit of the invention.

Fig. 1 shows my improved operating clutch mechanism with certain of the parts indicated diagrammatically;

Fig. 2 is a longitudinal sectional elevation of a detail of the invention; and

Fig. 3 is a sectional elevation of another detail of the invention, taken along the line 3—3 of Fig. 1.

Referring to the drawing, 1 represents the main power transmitting clutch of the railway car or other vehicle. I do not limit myself to any one type of clutch, but for convenience of illustration I have shown a cone clutch. A suitable clutch operating member is provided and, as illustrated, this takes the form of a hub 1*a*. Movement of this member serves to engage and disengage the clutch, and preferably a spring 2 is provided which tends to move the member 1*a* in a direction to hold the clutch in its engaged position.

In order to move the clutch operating member 1*a* in the opposite direction, a suitable pneumatic operating device 3 (Figs. 1 and 2) is provided, which is connected to said member by means of a lever 4. The device 3 does not, of itself, constitute any part of my invention, and it may be of any usual or preferred construction. For instance, a flexible diaphragm 3*a* may be provided, which is adapted to be engaged by compressed air or other elastic fluid on one side, and which is connected at the other side with the lever 4 by means of a rod or link 6.

Air is admitted to and exhausted from the pneumatic operating device 3 by means of a pipe 5. For controlling the flow of air through the pipe 5, two similar valves, 7 and 8, are provided, (Figs. 1 and 3) each of valves 7 and 8 being connected directly with the pipe 5 as shown. The valve 7 is also connected with a supply pipe 9 and an exhaust pipe 10. The valve 8 is connected with an exhaust pipe 11 but its normal inlet connection is omitted, or plugged as indicated at 12. Preferably, the exhaust pipes 10 and 11 have restricted outlets for a purpose hereinafter described. I have shown for this purpose adjustable reducing valves 13 and 14.

The valve 7 is so constructed that either the supply pipe 9 or the exhaust pipe 10 may be connected with the pipe 5. The valve 8 is similarly constructed but, as already stated, it has no connection with the supply pipe. If the valves 7 and 8 are in position to connect both of the exhaust pipes, 10 and 11, with the pipe 5, the pneumatic device 3 will be inoperative and the clutch 1 will be held in its engaged position by the spring 2. In practice, the valve 8 is first moved to close the exhaust pipe 11. Thereafter, the valve 7 is moved to close the exhaust pipe 10 and open the supply pipe 9. This permits compressed air to enter pipe 5 and the operating device 3, thus disengaging the clutch.

When it is desired to again engage the clutch, the valve 7 is moved to close the supply pipe 9 and open the exhaust pipe 10. Inasmuch as the pipe 10 has a restricted outlet, as already stated, the air is exhausted relatively slowly from the operating device 3 and the clutch is engaged slowly. If it is desired to engage the clutch more rapidly, the operator also moves valve 8 to open the exhaust 11, which also has a restricted outlet, as stated. With both exhaust pipes open the clutch is engaged much more rapidly. While I have shown only two valves, 7 and 8, it will be understood that any desired number may be used in order to obtain any desired variation in the amount of the exhaust and, accordingly, of the speed at which the clutch is engaged.

Preferably the valves, 7 and 8, are so constructed as to be controlled electro-magnetically. The details of construction of these electromagnetic valves form no part of the present invention, and any usual or preferred construction may be used. As illustrated, the construction is such that the supply inlets are connected with the pipe 5 when the valves are energized, and the exhaust outlets are connected with the pipe 5 when the valves are de-energized.

Electric supply conductors are indicated at 15 and 16, the conductor 15 being connected directly with the electro-magnetic valves, and the conductor 16 being connected therewith through a controller 17. The controller has a contact arm 18 manually movable by means of a lever 19 into any one of three positions indicated by *a*, *b*, and *c* respectively. At the position "*a*" the circuit is entirely broken and the valves are in position to connect pipe 5 with both exhausts. At the position "*b*" connection is made through a contact 20, which energizes the valve 8 to close the exhaust 11. At the position "*c*" connection is made not only through the contact 20, but also through a contact 21 to energize both valves, thus closing both exhausts and connecting the supply pipe 9 with pipe 5.

With the controller in the position "*c*" the pneumatic operating device 3 acts to disengage the clutch. When the controller is moved from the position "*c*" to the position "*b*", the supply pipe 9 is closed and the exhaust pipe 10 is open. This permits the clutch to be slowly engaged. If the operator desires to engage the clutch more rapidly he can move the controller immediately from the position "*c*" to the position "*a*". In this latter position both of the exhaust pipes, 10 and 11, will be open and the clutch will be engaged relatively rapidly.

Employing this construction the operator by means of the single lever 19 can cause the clutch to be engaged or disengaged and he can vary the rate of engagement in accordance with the operating conditions of the car or other vehicle.

What I claim is:

1. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or in selectively graduated communication with a restricted exhaust; and adjustable means independent of said valve means for varying the amount of restriction of the exhaust.

2. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device and a single manually movable lever for controlling the valve means to connect the said device with an air supply and to connect it in selectively graduated communication with an exhaust; and adjustable means independent of said valve means adapted to vary the amount of restriction of the exhaust.

3. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and means adapted to operate the valves successively but independently one of the other.

4. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and electro-magnetic means for operating the valves successively.

5. In a clutch operating mechanism, the combination with a clutch, a member movable to engage or disengage the clutch and means for automatically moving the said member in one direction, of a pneumatic device for moving the said member in the other direction, a valve for connecting the said device with an air supply or with a restricted exhaust, at least one additional valve for also connecting the said device with a restricted exhaust, and a single lever adapted to operate the valves successively but independently one of the other.

6. The combination of a power transmitting clutch, a spring tending to hold the clutch engaged, a pneumatic device for disengaging the clutch, a valve for connecting the said device with an air supply or with a restricted exhaust, at least one additional valve for also connecting the said device with a restricted exhaust, and means adapted to operate the valves successively but independently one of the other.

7. The combination in a mechanism of the type described of a clutch, a control member movable to engage or disengage the clutch, means for automatically moving the said member in one direction, a pneumatic device for moving the said member in the other direction, two similar electro-magnetic valves connected with the said device, one of the said valves having a connection to an air supply and also to a restricted exhaust, and the other of the said valves having only a connection to a restricted exhaust and electric connections for the said valves whereby they may be operated successively.

8. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or with a restricted exhaust while selectively controlling the extent of communication with the exhaust; and adjustable means independent of said valve means for varying the amount of restriction of the exhaust.

9. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or in graduated communication with a restricted exhaust; adjustable means independent of said valve means for varying the amount of restriction of the exhaust; and a lever controlling the operation of said valve means to adjustably determine the extent of communication of said pneumatic device with said restricted exhaust and thereby the speed of engagement of the clutch.

10. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively placing the said device in fixed communication with a motive fluid supply or in selectively adjustably varied communication with a restricted exhaust; and adjustable means independent of said valve means for varying the amount of restriction of the exhaust.

11. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or with a restricted exhaust having a selectively variable area controlled by said valve means; and adjusable means independent of said valve means for varying the amount of restriction of the exhaust.

12. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means for selectively connecting the said device with a motive fluid supply or through a selectively variable port area with a restricted exhaust; and adjustable means independent of said valve means for varying the amount of restriction of the exhaust to thereby regulate the speed of engagement of the clutch as determined by the variable port area of said valve means.

13. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means comprising a single motive fluid inlet port and a plurality of motive fluid exhaust ports for connecting the said device through the inlet port with a motive fluid supply or through a selected exhaust port with a restricted exhaust to thereby control the rate of re-engagement of the clutch and adjustable means independent of said valve means for varying the amount of restriction of the exhaust.

14. The combination in a mechanism of the type described, of a clutch; a control member movable to engage or disengage the clutch; means for automatically moving the said member in one direction to engage the clutch; a pneumatic device for moving the said member in the other direction for positively disengaging the clutch; valve means comprising a single motive fluid inlet port and a plurality of selectively available motive fluid exhaust ports for selectively connecting the said device with a motive fluid supply or with a restricted exhaust; and adjustable means independent of said valve means for varying the amount of restriction of the exhaust including an adjustable restricting element associated with each exhaust port.

15. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device embodying an air supply port and a plurality of exhaust ports and a single manually movable lever for operating the valve means to connect the said device with an air supply and to successively connect it through said ports with an exhaust; and adjustable means independent of said valve means adapted to vary the amount of restriction of the exhaust.

16. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device embodying an air supply port and a plurality of exhaust ports and a single manually movable lever for operating the valve means to connect the said device with an air supply and to successively connect it through said ports with an exhaust; and adjustable means independent of said valve means adapted to vary the amount of restriction of the exhaust embodying an adjustable restricting member associated with each port.

17. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device and a single manually movable lever for controlling the valve means to connect the said device with an air supply and to variably and selectively connect it with an exhaust; and adjustable means independent of said valve means adapted to vary the amount of restriction of the exhaust to thereby determine the speed at which said clutch engages in selected exhaust positions of said valve means.

18. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device and a single manually movable lever for controlling the valve means to connect the said device with an air supply and to connect it with an exhaust while selectively controlling the extent of communication with the exhaust; and adjustable means independent of said valve means adapted to vary the amount of restriction of the exhaust.

19. The combination in a mechanism of the type described, of a clutch; a control member movable to engage or disengage the clutch; means for automatically moving the said member in one direction to engage the clutch; a pneumatic device for moving said member in the direction to disengage the clutch; valve means for controlling the said device and a single manually movable lever for controlling the valve means to connect the said device in fixed communication with an air supply and to connect it in selectively graduated communication with an exhaust; and adjustable means independent of said valve means adapted to vary the amount of restriction of the exhaust.

20. The combination in a mechanism of the type described, of a clutch, a clutch control member, automatic means to move the clutch control member in a direction engaging the clutch, an operating member movable in opposite directions, operative connections between the clutch control member and said operating member whereby the control member is shifted against said automatic means to disengage the clutch during movement of the operating member in one direction and the control member is under influence of said automatic means when moving in the opposite direction, valve means including a port controlling movement of the operating member in the first-named direction, and port means to selectively control the speed of movement of said operating member in the last-named direction and thereby determine the speed of engagement of the clutch by said automatic means, means to operate said valve means to determine the speed of engagement of the clutch, and means independent of said valve means to adjustably determine the effective maximum area of said port means.

CHARLES O. GUERNSEY.